United States Patent
Lotito et al.

(10) Patent No.: US 6,304,179 B1
(45) Date of Patent: Oct. 16, 2001

(54) ULTRASONIC OCCUPANT POSITION SENSING SYSTEM

(75) Inventors: James C. Lotito, Warren; Mohannad F. Murad, Royal Oak; Brian K. Blackburn, Rochester; Edward Burley, Troy; Joseph F. Mazur, Washington; Scott B. Gentry, Romeo; Henry D. Frech, Washington, all of MI (US)

(73) Assignee: Congress Financial Corporation, Miami, FL (US)

( * ) Notice: Subject to any disclaimer, the term of this patent is extended or adjusted under 35 U.S.C. 154(b) by 0 days.

(21) Appl. No.: 09/259,752

(22) Filed: Feb. 27, 1999

(51) Int. Cl.[7] .................................................. G08B 13/12
(52) U.S. Cl. ................... 340/545.3; 340/436; 340/425.5; 340/540; 340/573.1; 367/13; 367/93; 367/99; 280/728.1; 280/375
(58) Field of Search ................... 340/425.5, 540, 340/573.1, 686.6, 545.3, 436; 367/93, 13, 99; 280/728.1, 375; 180/271

(56) References Cited

U.S. PATENT DOCUMENTS

| | | | |
|---|---|---|---|
| 4,608,674 | * 8/1986 | Guscott | 367/93 |
| 5,071,160 | * 12/1991 | White et al. | 280/735 |
| 5,330,226 | 7/1994 | Gentry et al. | 280/735 |
| 5,413,378 | 5/1995 | Steffens, Jr. et al. | 280/735 |
| 5,430,649 | 7/1995 | Cashler et al. | 364/424.05 |
| 5,461,567 | 10/1995 | Kelley et al. | 364/424.05 |
| 5,482,314 | 1/1996 | Corrado et al. | 280/735 |
| 5,483,449 | 1/1996 | Caruso et al. | 364/424.05 |
| 5,490,069 | 2/1996 | Gioutsos et al. | 364/424.05 |
| 5,624,132 | 4/1997 | Blackburn et al. | 280/735 |
| 5,732,375 | 3/1998 | Cashler | 701/45 |
| 5,749,059 | 5/1998 | Walton | 701/45 |
| 5,767,766 | 6/1998 | Kwun | 340/436 |
| 5,785,347 | 7/1998 | Adolph et al. | 280/735 |
| 5,790,031 | * 8/1998 | Shelton et al. | 340/573.1 |
| 5,809,451 | 9/1998 | Parsons et al. | 702/190 |
| 5,848,802 | * 12/1998 | Breed et al. | 280/735 |
| 5,997,033 | * 12/1999 | Gray et al. | 280/735 |
| 6,012,006 | 1/2000 | Ohneda et al. | 701/45 |

FOREIGN PATENT DOCUMENTS

WO97/09639  3/1997 (WO) .
WO98/33685  8/1998 (WO) .

* cited by examiner

Primary Examiner—Daniel J. Wu
Assistant Examiner—Tai T. Nguyen

(57) ABSTRACT

An occupant position measuring system (10) comprising: a transmitter for generating a pulse modulated transmitter signal; a receiver for receiving a reflection of the transmitter signal, the receiver being characterized as having a relatively low Q factor; a controller, responsive to the receipt of the reflected signal and for generating an indication of the distance between an occupant the transmitter.

11 Claims, 5 Drawing Sheets

ULTRASONIC OCCUPANT POSITION SENSING SYSTEM

BACKGROUND AND SUMMARY OF THE INVENTION

The present invention relates to an occupant position sensing system and more particularly to an ultrasonic sensing system.

Ultrasonic sensors have been used for proximity or distance measurement. These devices typically transmit a short burst of ultrasonic sound toward a target which reflects the sound back to the sensor. The system then measures the time for the echo to return to the sensor and computes the distance to the target using the speed of sound in the medium. In the context of a safety restraint system, this medium is air. To accurately use the echo as a measurement of distance, various environmental and operating parameters need to be taken into account or chosen carefully. As an example, the speed of sound in air will vary as a function of temperature. It is also known that the wavelength of sound changes as a function of both speed of sound and the frequency. There are also various attenuation factors such as the reduction of the amplitude of the sound wave due to humidity. Other factors in inaccuracies will enter the system due to background noise.

The object the present invention is to design a position sensor that will operate adequately in an acoustically and mechanically noisy environment such as the environment that will be found within the passenger compartment of a vehicle. It is an object of the present invention to provide a method of detection and tracking of an occupant's position in a crash utilizing ultrasonic technology. The ultrasonic transducer will be used in what is called a "smart occupant restraint system." These types of systems have been proposed in the art. Such systems are developed to control safety restraint devices such as the activation of an air bag during a crash in a way to provide more protection to the occupant. Typically when a crash occurs, a control device receives a signal emanating from a crash sensor indicating that a crash has occurred. Various sensors positioned about the passenger compartment are utilized to define the size and position of an occupant and these parameters are used by the controller to determine how best to operate the safety restraint devices. One of the critical elements in operating a smart occupant restraint system is to be able to determine accurately the position of a vehicle occupant relative to an air bag door, that is, the location of the non-activated air bag.

Accordingly the invention comprises an occupant position measuring system comprising: transmitter means for generating a pulse modulated transmitter signal; receiver means for receiving a reflection of the transmitter signal, the receiver means being characterized as having a relatively low Q factor; control means, responsive to the receipt of the reflected signal and for generating an indication of the distance between an occupant and the receiver means. The transmitter means may also preferably be of a low Q factor.

Many other objects and purposes of the invention will be clear from the following detailed description of the drawings.

DETAILED DESCRIPTION OF THE DRAWINGS

Figure 1:
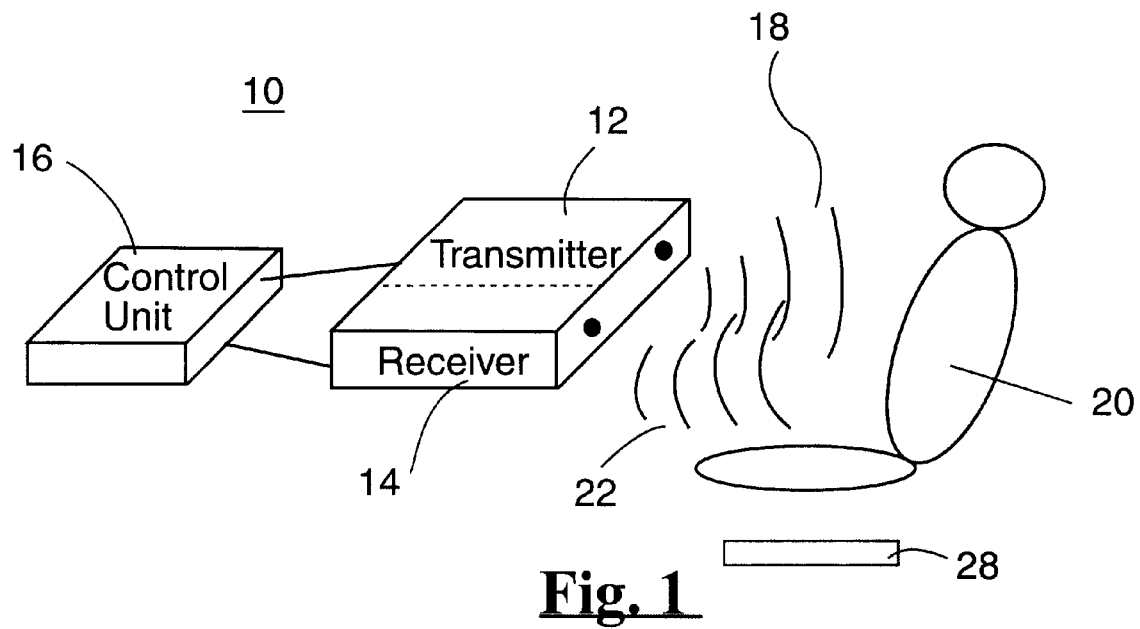
FIG. 1 shows a typical ultrasonic distance measuring system.
Figure 3:
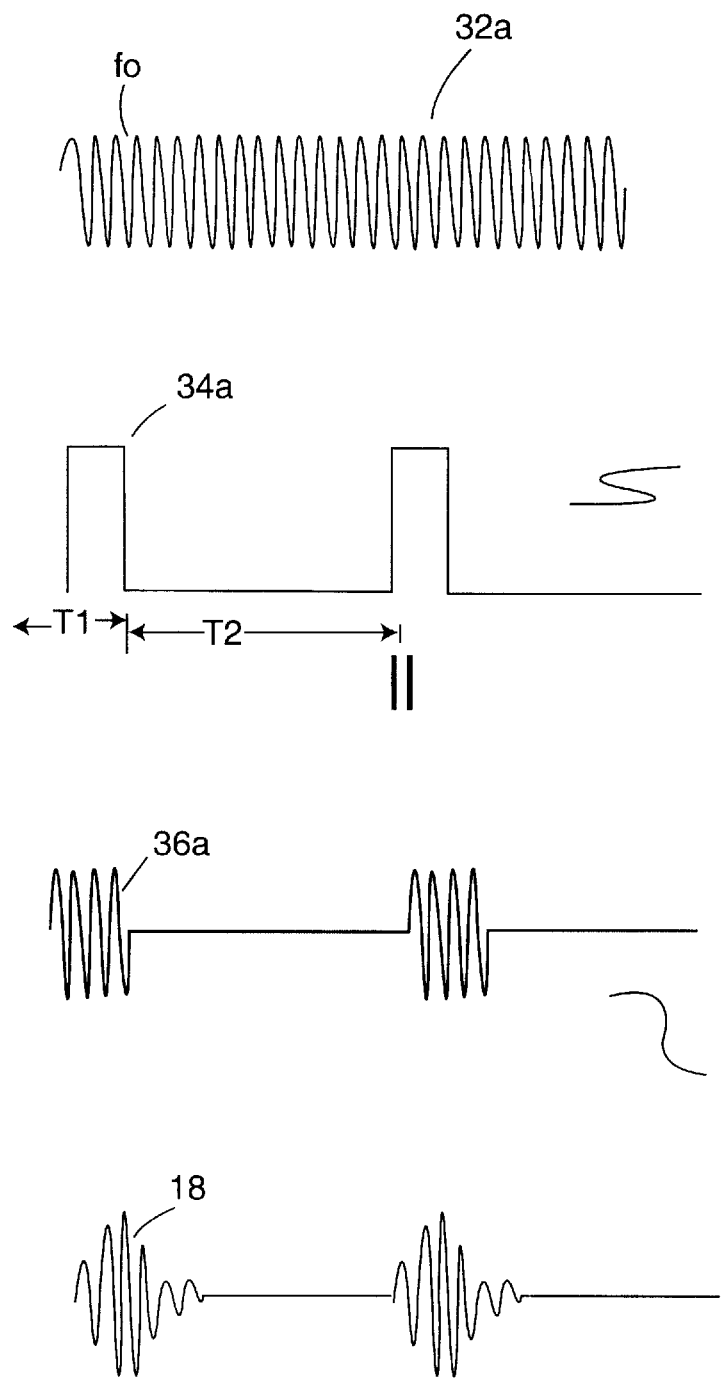
FIG. 3 shows various system waveforms.

Reference is made to FIG. 1 which illustrates a typical occupant position system 10. The system includes a transmitter 12 and a receiver 14. The transmitter and receiver are controlled by a control unit 16 which is used to activate the transmitter, receive the echo or reflected signal and calculate the occupant's position. The transmitter 12 and the receiver are analogous to a speaker and microphone found in many acoustic systems. As can be appreciated one physical device or sensor can operate as both a transmitter and receiver or separate components can be used. In general, the transmitter will generate an ultrasonic pulse or burst of pulses 18 at or centered about a predetermined frequency $f_0$, typically about 40 kHz. The duration of the transmitted signal is shown as $T_1$ (FIG. 3.) This signal, as graphically illustrated in FIG. 1, will strike the occupant 20 and its echo or the reflection 22 will be reflected back during interval $T_2$, toward the receiver 14. This signal, as graphically illustrated in FIG. 1, will strike the occupant 20 and its echo or the reflection 22 will be reflected back toward the receiver 14. The receiver 14 senses or collects the reflected signal 22 and communicates it to the control unit 16. The control unit 16 determines the time differential between transmission and reception of the reflected signal and calculates the distance between the occupant and the location of the transmitter/receiver unit. The control unit may include means for compensation for environmental factors which effect the speed of sound such as temperature and humidity. FIG. 1 also shows a weight sensor 28 positioned below the occupant such as within a seat cushion (which is not shown). This sensor 28 is representative of other sensors that may be used to provide information about the occupant.

Figure 2:
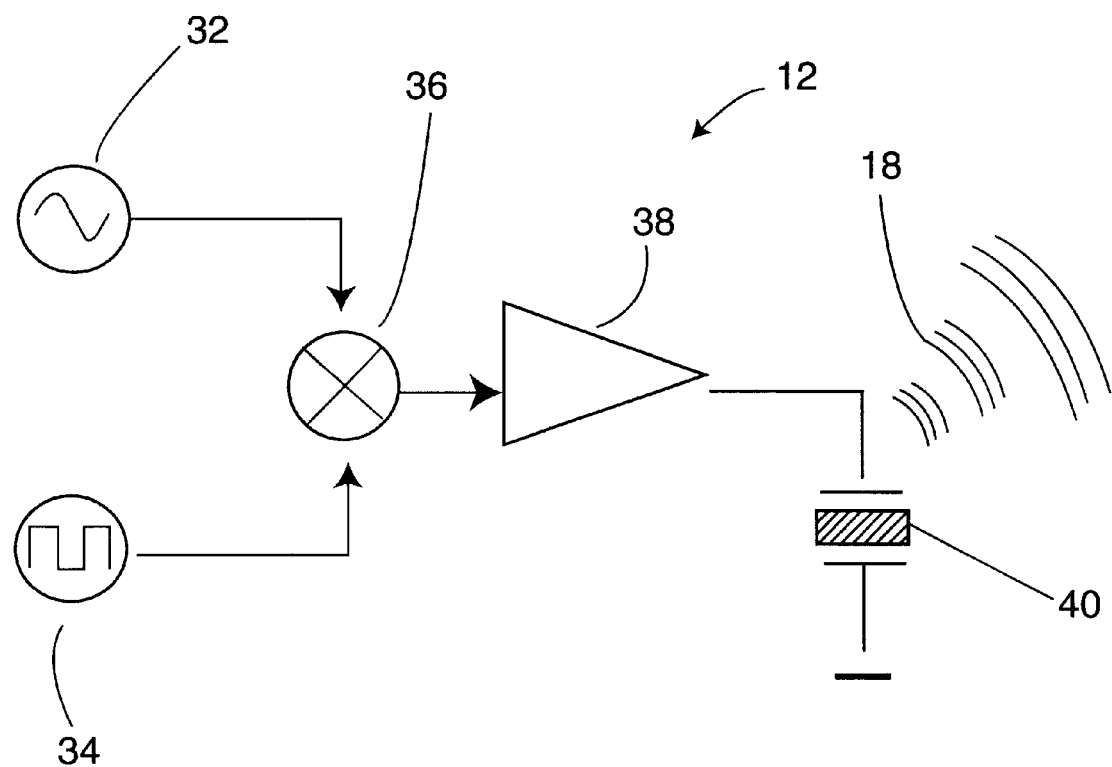
FIG. 2 illustrates an ultrasonic transmitter.

Reference is briefly made to FIG. 2 which illustrates a typical ultrasonic transmitter 12. The transmitter 12 includes a sinusoidal oscillator 32 operating a frequency $f_0$, a pulse generator 34, multiplier circuit 36, an amplifier 38 and a piezoelectric transducer 40. Other transducers such as magnetostrictive may be substituted. The output of the multiplier 36 is a pulse-modulated signal (line 3, FIG. 3) resulting from multiplying the sinusoidal signal 32a (line 1, FIG. 3) and the pulsed signal 34a (line 2, FIG. 3) emanating from the sinusoidal oscillator and pulse generator respectively. The pulse-modulated signal 36a is appropriately modified by the amplifier 38, if used. It is this signal which excites the transducer 40. The output of the transducer 40 will vary slightly from the pulse modulated wave form and depend upon its physical characteristics as discussed below and is shown in line 4, FIG. 3. In general, the pulse modulated wave 36a and the output of the transmitter are waveforms which have period equal to $T_1 + T_2$. In the present invention the total period of the transmitted signal $T_1$ and the echo $T_2$ is approximately 5–20 milliseconds, and $T_1$ is about 250 microseconds and $T_2$ is approximately 5 milliseconds. The pulse modulation permits the ultrasonic wave to be broadcast during a first duration or period $T_1$ The transmitter is essentially turned off during the second duration or period $T_2$. $T_2$ is also referred to as the listening time of the receiver 14.

In the preferred embodiment of the invention both the transmitter 12 and the receiver 14 use piezoelectric transducers. Further, the transmitter 12 is physically turned off during period $T_2$ to reduce mechanical and electrical interference between the transmitter 12 and the receiver 14.

Figure 4:
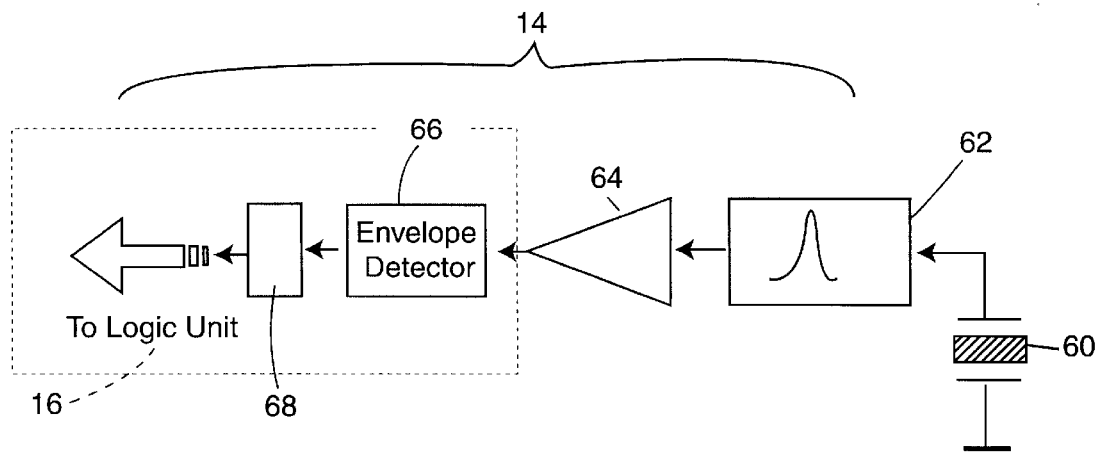
FIG. 4 shows an ultrasonic receiver JIM.

Reference is now made to FIG. 4 which illustrates the receiver 14 of the present invention. The receiver preferably comprises a low-cost electromechanical, piezoelectric transducer 60, the output of which is received by a band pass filter 62. Other transducers may be substituted. The output of the band pass filter 62 is communicated to an amplifier 64 which feeds an envelope detector 66. The output of the envelope detector is fed to an analog-to-digital converter 68 and then to the control unit 16. As can be appreciated any of the filter 62, the amplifier 64, the detector 66 and the converter 68 can also be part of the control unit 16. The transducers 40 and 60 can be identical and one transducer can be used as both the transmitting element and the receiving element.

Both the electromechanical transmitting transducer 40 and the electromechanical receiving transducer 60 oscillate or are forced to oscillate at determinable frequencies. Oscillatory systems, whether electrical or mechanical, can be described by a Q factor. This factor is often called "quality factor." In other contexts it is called the "sharpness of resonance." As can be appreciated, the higher the Q value of a circuit or a transducer, the lower the driving power levels, energy or force needed to excite and drive the transducer. As can be appreciated, the piezoelectric transducer 40 will oscillate at a predefined frequency or band of frequencies dependent on the Q-factor. With regard to the transmitting transducer 40 its Q-factor can be high or low, each approach has its inherent benefits and detriments. However, with regard the receiving transducer 60 of the present invention, it is preferable that it be characterized as a low Q element. Consider the following: were the transducer 60 designed to be a high Q element, then any noise such as resulting from a high slew rate modulation in the passenger compartment will cause the transducer 60 to oscillate. High slew rate noise can be characterized as broadband noise. This type of noise can arise for example, by turning the radio on and off at full power to the speaker. This oscillation may induce error in the determination or calculation of the distance d, between the air bag (the location of the transducer 40) and the occupant. This noise can result from mechanical or electrical sources and may be transmitted by conduction or radiated through the air. Spurious excitation may also arise because of the cross coupling between the transmitter 12 and receiver 14.

Mechanical or electrical components with a very high Q factor are extremely oscillatory and are susceptible to being excited by unwanted signals or signal components. While a high Q transmitter is usable with the present invention a lower Q transmitter is preferred. Consider for the moment line 4 of FIG. 3, which shows a relatively low Q transmitter 12 (transducer 40). With a high Q transducer 40 the transducer may continue to resonate even after the transmitter is turned off. This resonance extends into period $T_2$, that is, the listening time of the receiver 14. This oscillation may be sensed by the receiver 14 and identified by the control unit 16 as a valid reflected signal indicative of however, an incorrect position.

Figure 5:
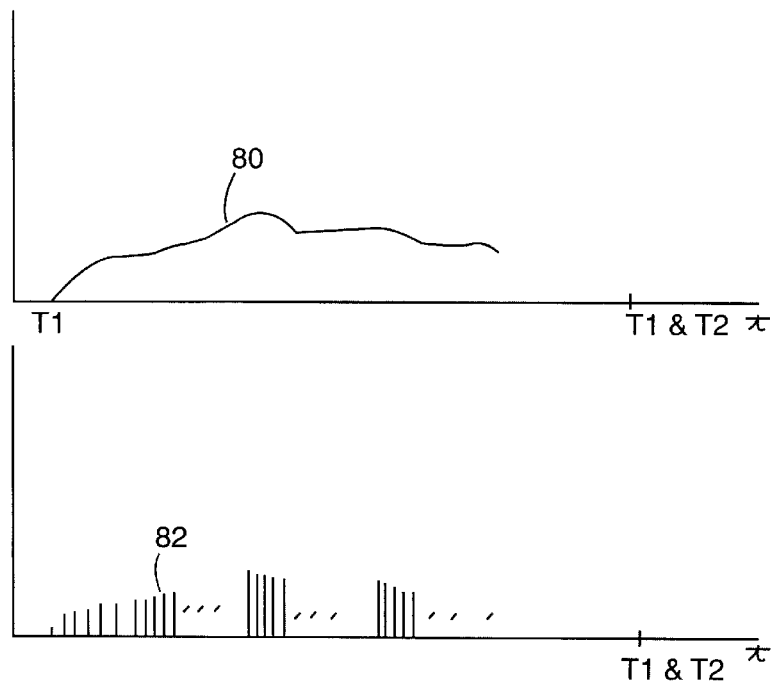
FIG. 5 shows other system waveforms

In the present invention the receiving element 60 is also characterized by a low Q factor. Based upon testing it has been found that adequate receiver response can be characterized by a Q of less than 5, with, a Q of approximately 1 being preferable. The receiving element 60 will convert mechanical sound energy to electrical energy. Implicitly, the low Q factor means that the frequency response of the receiving transducer 60 will be broadband centered about the transmission frequency $f_0$. As such the power or magnitude associated with the frequencies on either side of the center or design frequency $f_0$ are relatively attenuated. The broadband electrical signal emanating from the acoustic transducer or receiver 60 is filtered by the band pass filter 62. In the present invention filter 62 is a narrow band filter centered at the transmitted frequency $f_0$. In this manner, the filter 62 attenuates noise or other signals that are not centered about the transmitted frequency $f_0$. The filtered signal is amplified (at 64) and passed to an envelope detection circuit 66, the output of which is shown on line 1 of FIG. 5 and identified as numeral 80. The output of the A/D converter 68 is a digital value which corresponds to the output of the envelope detector. In the present invention, the A/D converter samples the analog input signal at a clocking rate determined by the control unit 16. The sampling speed in the illustrated embodiment is about 5–20 microseconds, which may correspond to the internal clock of the control unit 16 which will yield a plurality of data points in the interval $T_2$ (the number of points dependent upon the duration of this interval) This data is used to calculate the position of the occupant and is shown on line 2 of FIG. 5 as numeral 82.

Included within this burst of data received in the interval $T_2$ is information defining the distance of the occupant to the datum (such as the location of the receiver 14. In one embodiment the present invention uses the first data point (or data cluster) that exceeds a defined threshold as the measure of occupant distance. Each data point (or data cluster) is tested against a threshold, the time $T_c$ corresponding the first data point or cluster which is above the threshold is stored and used as a measure of the distance as illustrated in equation 1 below.

$$d=(V_s * T_c)/2 \qquad (1)$$

where d is the distance to the occupant from the transmitter 12, Vs is the speed of the sound (as adjusted for temperature and humidity). The above threshold can be a constant, a band or a variable as described below.

Figure 6:
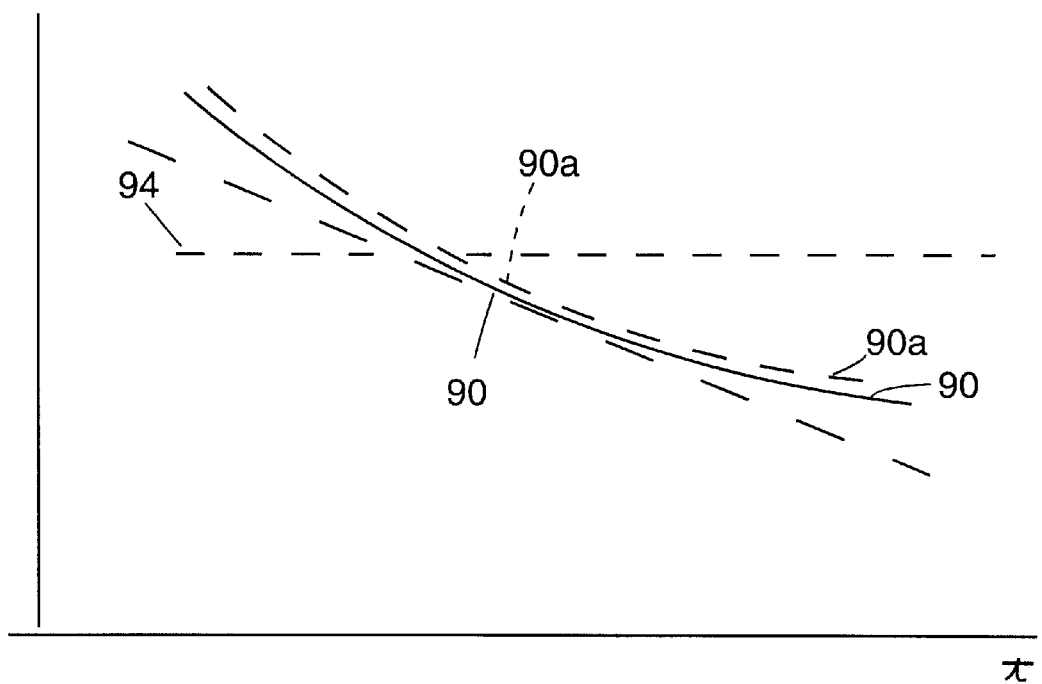
FIG. 6 illustrates a data threshold.

Reference is made to FIG. 6 which shows a variable threshold 90. The horizontal axis is time (which is also inherently position) and the vertical axis is signal magnitude. As can be seen the magnitude of the threshold, in this embodiment, decreases with time, this is, the time $T_c$, to receive the echo or reflected signal (which is equatable to the distance to the occupant). This variation relates to the fact that the reflected signal or echo will be stronger, i.e. a high magnitude, if the occupant is positioned close to the transmitter 12 and receiver 14 and that any effect of dispersion or beam angle of the transmitted ultrasonic wave 18 and reflected wave 22 and any attenuation or variation of the speed of the transmitted signal are low. Consequently if a valid signal were detected at, for example, time $T_c=t_1$ the magnitude of the signal would exceed a large value as the occupant is in close proximity to the transmitter 12. If however, the reflected signal were received at, for example, a time $T_{c=t2}$, where $t_2$ is a longer duration than $t_1$, the magnitude of the received signal would be correspondingly reduced. As such a variable threshold, such as 90 is chosen which requires the received signals to exceed a larger threshold, if received in a small time increment. The variable threshold is also reduced to account for the expected attenuation of magnitude of the reflected signals which take longer to be received (and which correspond to larger measured occupant distances). As mentioned above a fixed threshold can be used such as shown by numeral 94. The threshold, rather than being a line as shown can be an area between upper and lower thresholds 90 and 90a. The threshold can be linear or curved and chosen based on the characteristics of the particular transmitter and receiver.

As the sensing environment is less than ideal the present invention contemplates a further filtering of the data received by the control unit 16. Rather than testing for the first data point which is above the threshold the control unit 16 stores clusters of data to generate a moving average such as defined in equation (2) below:

$$A_{avg}=(tn+tn-1+tn-2+tn-3+tn-4+tn-5+tn-6+tn-7)/8$$

In the embodiment shown each cluster of data averages eight (8) successive bits of data received from the A/D converter. As can be appreciated the average can be calculated using any number of data points such as for example, n=2 through 7). The control unit 16 will store the time $T_c$ when the running average $A_{avg}$, for the data cluster at time $T_c$, exceeds the threshold either variable or constant threshold and use this time as a measure of the distance to the occupant per equation (1) above.

Figure 7:
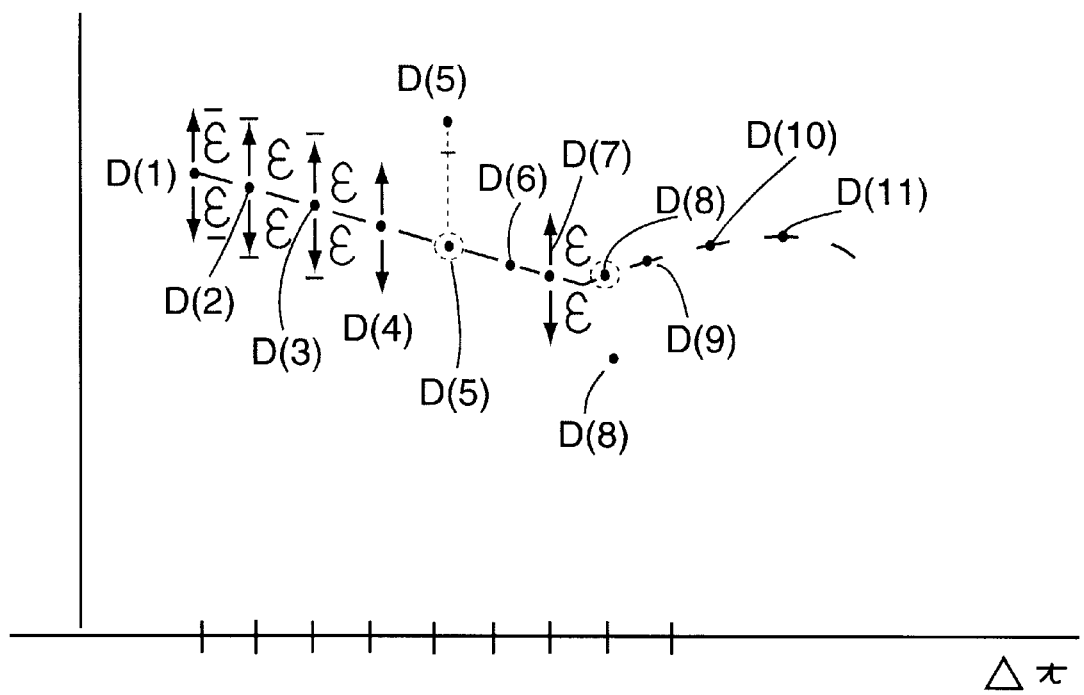
FIG. 7 shows data point collected by the system.

Reference is briefly made to FIG. 7 which illustrates a plurality of data that has been received by a respective sensing device. This data or rather data points D(1) through D(11), in the preferred embodiment, are generally received at constant periodic time intervals. A visual inspection of FIG. 7 will lead to a possible conclusion that data points D(5) and D(8) may be representative of a transient occurrence since these data points deviate dramatically from the trend established by the prior data points. It is also an object of the present invention to eliminate data that may have been generated by such transient events. These transient events may arise because of electrical or mechanical noise or some other source of signal corruption.

In the context of an occupant position sensor or system which attempts to measure the position of the occupant's upper torso relative to the position of the transmitter, such as 12, transient data may arise, for example, if the occupant momentarily places his or her arm, a book, a piece of paper, etc. between the chest and the transmitter. Transient signals may also arise in the measurement of the occupant's weight or in the output of any sensor.

FIG. 7 represents a system such as 10 which samples sensor output signal (such generated by the receiver 14) or weight sensor 28 at defined, though relatively small, periods, such as 5 ms. The control unit 16 monitors each new data point and compares the new data point to the prior data point or points. If the magnitude of change of this new data point exceeds a permitted bound (±), this new data point will be discarded and replaced with a substitute data point. The value of this substituted data point will be based upon previous data received and collected by the control unit 16. As an example, if the absolute value of the new data point such as D(5) exceeds the magnitude of an older data point (or points) such as D(4)±a permitted bound, the "new" data point D(5) is discarded and replaced with a substitute new data point D' (5). The substituted value of this data point D' (5) may be a) equated to the value of the previous data point D(4) or alternatively, b) the substitute data point such as D' (5) may be equated to a running average of a number of the prior data points. One example of this running average is: $D_{avg}=(D4+D3+D4)/3$. Running averages using more or less data points can be substituted.

Figure 8:
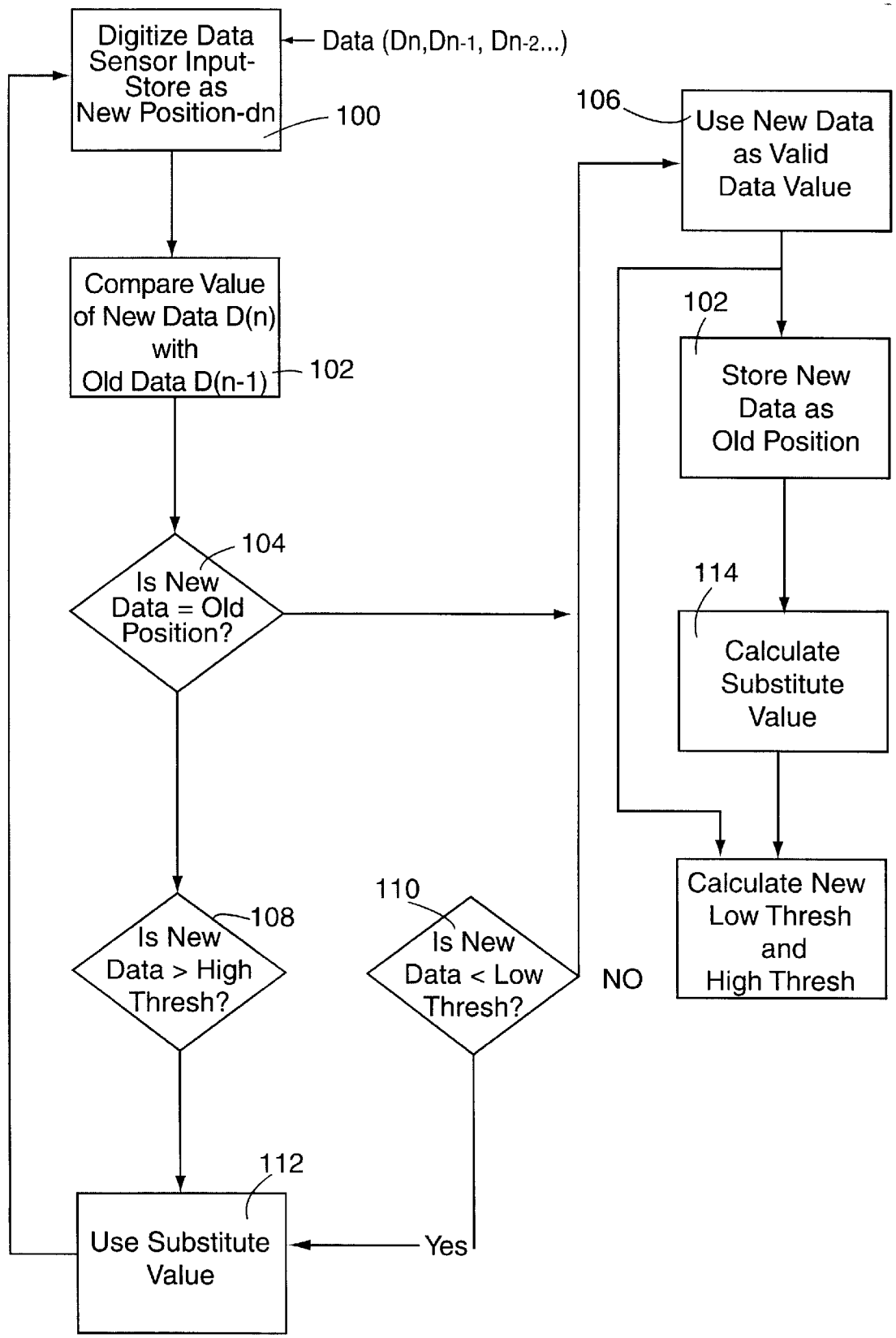
FIG. 8 is a block diagram illustrating the operation one embodiment of the system.

Reference is now briefly made to FIG. 8 which illustrates a flow diagram of this aspect of the invention. Data is collected and stored (see block 100). If the data is originally received in analog form, it is first digitized. The stored data will at least be the current or new value of measured data D(n) and the immediate prior value D(n−1). If for example, the invention utilizes the running average calculation described above, additional prior data points are stored. The magnitude or value of the most current data point D(n) is compared to the value of the data point just immediately received, that is D(n−1) (see block 102). If the value of the new and prior data points (see block 104) are equal, the new data point is considered a valid data point (see block 106). If, however, the new and old data points are not equal, the new data is tested to see whether or not it exceeds a high threshold level determined by D(n)+a permitted bound (see block 108) and is then tested to see if the new data point exceeds a low threshold (see block 110) of D(n)−a permitted bound. If the new data point exceeds the upper and/or lower thresholds, this data point (such as D(5) in the above example) is discarded and replaced by a substitute data point D' (n) (see block 112). This substitute data point is now used, in subsequent calculations, as the "old" data point in block 102. Beginning again with block 106 and as mentioned above, if the new data point D(n) is a valid data point it is stored to be used in subsequent calculations as the old data point. This step of storing is represented by repeating block 102. In addition, the new data value or data point established in block 106 is used to calculate the substitute value D' (n)(see block 114) to be used in conjunction with the newest data point (see block 112) during the subsequent computational cycle. Alternatively, to equating the substitute value as the preceding value of the last data point or to a running average, a root-mean-square calculation or median calculation can be used. Finally, the new data point achieved in block 106 is used to calculate the high and low threshold to be used to test the newest (or next) data point.

In the context of an occupant sensing system, the value of the maximum level of occupant's motion, defining the threshold, is chosen based upon empirical data which provides a basis for determining how fast an occupant's torso or occupant's arm can move during a crash event. In the context of the present invention the maximum level of occupant's motion, is chosen as 12.7 mm/5 ms (0.5"/5 ms). Physically this limit would mean that a part of the occupant would be moving at a speed in excess of 100 inches per second which is not realizable in a typical vehicular accident. Other values that are representative of the maximum level of occupant motion under various crash scenarios can be substituted.

As mentioned above, this technique of insuring the quality of the data collected can be used to ensure the data quality of the output of any sensor. In the context of a weight sensor such as 28 the occupant will vary the output of the sensor 28 as he slowly moves about the seat during a non-emergency period, and is moved relative to the seat during a vehicular crash. The appropriate threshold value for use with a weight (or other) sensor is also determined by experimentation.

Many changes and modifications in the above-described embodiment of the invention can, of course, be carried out without departing from the scope thereof. Accordingly, that scope is intended to be limited only by the scope of the appended claims.

What is claimed is:

1. A vehicle mounted ultrasonic occupant position measuring system (10) comprising:

transmitter means (12) for generating a pulse modulated transmitted ultrasonic signal mounted within a passenger compartment of a vehicle;

receiver means (12) mounted within the passenger compartment of the vehicle for receiving a reflection of the transmitted ultrasonic signal, the receiver means being characterized as having a Q factor less than 5;

a narrow band filter (62) centered on the transmitted signal operatively connected to the receiving means for attenuating noise;

an envelope detection circuit (66), operatively connected to the narrow band filter;

an analog-to-digital converter (68) operatively connected to the envelope detection circuit (66);

a control unit (16) which is used to activate the transmitter means (12), and receive the reflection of the transmitted signal, the control unit (16) providing a means for calculating the position of the occupant, the control unit employing a threshold requiring a lower signal strength with greater time to receive the reflection.

2. The system as defined in claim 1 further including control means, responsive to the receipt of the reflected signal and for generating an indication of the distance between an occupant and the transmitter means.

3. The system as defined in claim 1 wherein the transmitter means and the receiver means are realized by a single device.

4. The system as defined in claim 1 wherein the transmitter means includes an electric to acoustic transducer.

5. The system as defined in claim 1 wherein the transmitter means includes means for generating a pulse modulated signal during a first time period $T_1$ and having a dwell or off period substantial equal to a duration $T_2$.

6. The occupant position sensor of claim 1 wherein the receiver (14) has a Q factor of Q of approximately 1.

7. A method of determining occupant position within a vehicle comprising repeatedly:

transmitting a pulse modulated ultrasonic signal towards the occupant (20) of the vehicle;

receiving a reflection of the transmitted ultrasonic signal from the occupant with a receiver (14) having a Q factor of less than 5;

filtering the reflected signal through a narrow band filter (62) centered on the transmitted pulse modulated signal;

using an envelope detection circuit (66) to process the signal;

converting the signal from the envelope detection circuit (66) with an analog-to-digital converter (68);

employing a control unit (16) to send the transmitted pulse modulated signal and to receive the reflection of the transmitted signal, the control unit (16) calculating the position of the occupant, and employing a signal acceptance threshold requiring a lower signal strength with greater time to receive the reflection.

8. The method of claim 7 further comprising filtering the reflection received by the control unit to eliminate data generated by transient events.

9. The method of claim 7 wherein the data eliminated by transient events is replaced with an average value based on previous data values.

10. The method of claim 8 wherein the further filtering of the reflection received by the control unit utilizes a threshold for occupant motion of speeds in excess of (0.5"/5 ms) for eliminating data generated by transient events.

11. The method of claim 7 wherein the receiver means is characterized as having a Q of approximately 1.

* * * * *